US009189647B2

(12) United States Patent
Furukawa

(10) Patent No.: US 9,189,647 B2
(45) Date of Patent: Nov. 17, 2015

(54) ENCRYPTED DATABASE SYSTEM, LINKING METHOD, AND MEDIUM

(71) Applicant: NEC CORPORATION, Tokyo (JP)

(72) Inventor: Jun Furukawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/396,560

(22) PCT Filed: Apr. 12, 2013

(86) PCT No.: PCT/JP2013/061050
§ 371 (c)(1),
(2) Date: Oct. 23, 2014

(87) PCT Pub. No.: WO2013/161586
PCT Pub. Date: Oct. 31, 2013

(65) Prior Publication Data
US 2015/0095664 A1 Apr. 2, 2015

(30) Foreign Application Priority Data

Apr. 24, 2012 (JP) .................................. 2012-098404

(51) Int. Cl.
G06F 21/62 (2013.01)
G06F 17/30 (2006.01)
(Continued)

(52) U.S. Cl.
CPC ...... *G06F 21/6218* (2013.01); *G06F 17/30477* (2013.01); *G06F 17/30595* (2013.01);
(Continued)

(58) Field of Classification Search
CPC .............. G06F 21/62; G06F 17/30477; G06F 21/6218; G06F 21/6254; G06F 21/602; G06F 17/30595; H04L 9/0894; H04L 9/0869
USPC ................................... 713/193, 190, 165, 171
See application file for complete search history.

(56) References Cited

U.S. PATENT DOCUMENTS 7,082,455 B2 * 7/2006 Hu et al. ........................ 709/203
7,093,137 B1 * 8/2006 Sato et al. ...................... 713/193
(Continued)

FOREIGN PATENT DOCUMENTS

JP 04-213765 A 8/1992
JP 2003-186725 A 7/2003
(Continued)

OTHER PUBLICATIONS

Georgios Amanatidis et al., "Provably-Secure Schemes for Basic Query Support in Outsourced Databases," Lecture Notes in Computer Science, 2007, pp. 14-30, vol. 4602.
(Continued)

Primary Examiner — Haresh N Patel
(74) Attorney, Agent, or Firm — Sughrue Mion, PLLC

(57) ABSTRACT

This encrypted database system is constituted by the connection of client terminal, which encrypts and outputs a first table having row a and row b data that has been input and a second table having row c data by means of a secret key stored in advance and sends a partial connection command that connects the row b and row c as a key for data in which the value for row a is greater than or equal to p and less than q in this table to the outside with a range search key generated from the secret key, and an encrypted database server, which receives and records the encrypted first and second tables, extracts data for each in which the values for row a from the encrypted first and second tables are greater than or equal to p and less than q using the range search key, and connects and returns row b and row c for this extracted data as a key.

6 Claims, 16 Drawing Sheets

(51) Int. Cl.
H04L 9/08 (2006.01)
G06F 21/60 (2013.01)

(52) U.S. Cl.
CPC ............ G06F21/602 (2013.01); G06F 21/62 (2013.01); G06F 21/6254 (2013.01); H04L 9/0869 (2013.01); H04L 9/0894 (2013.01)

(56) References Cited

U.S. PATENT DOCUMENTS

| | | | | |
|---|---|---|---|---|
| 2003/0191721 | A1* | 10/2003 | Fiammante | 705/65 |
| 2008/0240434 | A1* | 10/2008 | Kitamura | 380/255 |
| 2012/0216041 | A1* | 8/2012 | Naono et al. | 713/171 |
| 2013/0191650 | A1* | 7/2013 | Balakrishnan et al. | 713/190 |
| 2014/0331044 | A1* | 11/2014 | Fujii et al. | 713/165 |

FOREIGN PATENT DOCUMENTS

| | | |
|---|---|---|
| JP | 2005-134990 A | 5/2005 |
| JP | 2010-061103 A | 3/2010 |
| JP | 2010-272030 A | 12/2010 |
| WO | 2012/043012 A1 | 4/2012 |
| WO | 2012/043056 A1 | 4/2012 |

OTHER PUBLICATIONS

Written Opinion of the International Searching Authority of PCT/JP2013/061050 dated May 14, 2013.

International Search Report of PCT/JP2013/061050 dated May 14, 2013.

* cited by examiner

Fig.3

| TABLE "X" | COLUMN "A" | COLUMN "B" | ・・・(OTHER COLUMNS) |
|---|---|---|---|
| ・・・ | ・・・ | ・・・ | ・・・ |
| i-TH ROW | a [i] | b [i] | ・・・ |
| ・・・ | ・・・ | ・・・ | ・・・ |

| TABLE "X" | COLUMN "A" | ... | COLUMN "B" | ...(OTHER COLUMNS) |
|---|---|---|---|---|
| ... | ... | ... | ... | ... |
| i-TH ROW | RANGE SEARCHED-FOR KEY (X,A, a[i]), enc(a[i]) | ... | RANGE SEARCH CRYPTOGRAM (X,Aa,[j]), SEARCH KEY(Y,C, b[j])), enc(b[i]) | ... |
| ... | ... | ... | ... | ... |

41a — Column "A"
41b — Column "B"
41 — table row

Fig.12

| COLUMN IA (NAME) | COLUMN IB = IIB (CARD NUMBER) | COLUMN IIC (EXPIRATION DATE) |
|---|---|---|
| UEDA | 48929 | 2012/9/2 |

901a · COLUMN IA (NAME)
901b (902a) · COLUMN IB = IIB (CARD NUMBER)
902b · COLUMN IIC (EXPIRATION DATE)
904 → table

Fig.16

| 914 ↘ 911a | 911b (912a) | 912b |
|---|---|---|
| COLUMN IA (NAME) | COLUMN IB = IIB (CARD NUMBER) | COLUMN IIC (EXPIRATION DATE) |
| Hash(K,UEDA),Enc(k,UEDA) | Hash(K,48929),Enc(k,48929) | Enc(k,2012/9/2) |

ENCRYPTED DATABASE SYSTEM, LINKING METHOD, AND MEDIUM

CROSS REFERENCE TO RELATED APPLICATIONS

This is a National Stage of International Application No. PCT/JP2013/061050 filed Apr. 12, 2013, claiming priority based on Japanese Patent Application No. 2012-098404 filed Apr. 24, 2012, the contents of all of which are incorporated herein by reference in their entirety.

TECHNICAL FIELD

The present invention relates to encrypted database systems, client terminals, database servers, data linking methods and programs, and, particularly, relates to an encrypted database system or the like which enables preventing the risk of unnecessary leaking out of data.

BACKGROUND ART

With computerization of business core in enterprises and the like, most enterprises have a large scale database to contain a great amount of data used for business purposes. Because these pieces of data are important for their businesses and because of the aspect of personal information protection, they should never leak out to the outside. For this reason, it is often the case that, in such a large scale database, data contained therein is encrypted.

A database can be regarded as a set of a large number of tables. Hereinafter, a description will be given of an encryption method described in NPL 1, which is called a searchable encryption and is used in a database wherein data contained therein is encrypted (hereafter, referred to as an encrypted database), for the purpose of linking between two tables without decrypting individual elements.

In this method, a cryptographic hash function Hash and a common key cryptography (Enc, Dec) are used. When a plaintext is expressed by m and an encryption key is expressed by k, the encryption function Enc generates a cryptogram c by c=Enc(k, m), and when the cryptogram is c and the encryption key is expressed by k, the decryption function Dec decrypts the cryptogram c by m=Dec(k, c).

The searchable encryption encrypts a plaintext m as shown by a following equation 1 by using a set of secret keys (K, k). Its decryption can be processed in the form of a following equation 2.

$$C := (C[1], C[2]) = (\text{Hash}(K, m), \text{Enc}(k, m)) \quad \text{[Equation 1]}$$

$$m = \text{Dec}(k, C[2]) \quad \text{[Equation 2]}$$

In this method, when the plaintexts m are same, the first elements C[1] of cryptograms are always same. That is, determination of identity between plaintexts is possible without decrypting their cryptograms, and accordingly, natural linking between tables in terms of the same elements becomes possible.

FIGS. 9 and 10 are explanatory diagrams showing data in tables before linking, in the searchable encryption method, which is an existing technology. FIG. 9 shows a table "I" 901, and FIG. 10 shows a table "II" 902. The table "I" 901 has a column "IA" 901a and a column "IB" 901b, and the table "II" 902 has a column "IIB" 902a and a column "IIC" 902b.

FIG. 11 is an explanatory diagram showing a table "III" 903 which is obtained by linking the table "I" 901 shown in FIG. 9 with the table "II" 902 shown in FIG. 10. Because a column "IB" 901b in the table "I" 901 and a column "IIB" 902a in the table "II" 902 are each a column for "card number", it is possible to link the tables with each other by a condition of column "IB"=column "IIB" (by linking a piece of data having an element value in the column "IB" with a piece of data having the same element value in the column "IIB"), and by that way, the table "III" 903 can be obtained.

FIG. 12 is an explanatory diagram showing a table "III'" 904 which is obtained by extracting a row having a value "Ueda" in the column "IA (name)" from the table "III" 903 shown in FIG. 11. In the above-described process, individual elements in the tables "I" 901 and "II" 902 are not encrypted.

However, the above-described process practically needs to be performed in a state where the individual elements are encrypted, without decrypting the individual elements. To enable it, it is necessary to make it possible to determine whether or not an element value in the column "IB" is the same as that in the column "IIB". Then, the above-described encryption method referred to as the searchable encryption is used.

FIGS. 13 and 14 are explanatory diagrams showing, respectively, an encrypted table "I" 911 and an encrypted table "II" 912, which are obtained by encrypting the table "I" 901 shown in FIG. 9 and the table "II" 902 shown in FIG. 10, respectively, by the searchable encryption. In the encrypted table "I" 911 and the encrypted table "II" 912, each element is encrypted according to the above-described equation 1 by using the set of secret keys (K, k).

FIG. 15 is an explanatory diagram showing an encrypted table "III" 913 which is obtained by linking the encrypted table "I" 911 shown in FIG. 13 with the encrypted table "II" 912 shown in FIG. 14. In order to link the encrypted table "I" 911 with the encrypted table "II" 912, it is necessary to determine whether or not an element value in the column "IB" 901b is the same as that in the column "IIB" 902a before encrypted.

According to the searchable encryption, because it is possible to determine whether or not m and m' before the encryption are equal by determining whether or not Hash(K, m) and Hash(K, m') from encrypted elements are equal, the same can be determined, the encrypted table "III" 913 can be obtained by that way.

FIG. 16 is an explanatory diagram showing an encrypted table "III'" 914 obtained by extracting a row having a value "Hash(K, Ueda)" in the column "IA (name)" from the encrypted table "III" 913 shown in FIG. 15. As mentioned above, the encrypted table "III'" 914 can be obtained without decrypting the individual elements so far. A right user having the set of secret keys (K, k) can know the element, which is the "expiration date" of a credit card held by "Ueda" in this case, in the column "IIC" 902b related to this.

As other technical documents related to the above-described technology, the following ones will be mentioned. PTL 1 describes a relational database in which, using an index table obtained by generating ranking of items and encrypting it, a range search can be performed in a state where the items are kept encrypted. PTL 2 describes an encrypted database search device which performs a matching process in a state where a keyword is kept encrypted.

PTL 3 describes a technology which generates an index file using an encrypted keyword and thereby enables searching an encrypted file. PTL 4 and PTL 5 each describe a technology which reduces a time required for table linking in a distributed database system.

CITATION LIST

Patent Literature

[PLT 1] Japanese Patent Application Laid-Open No. 2003-186725
[PLT 2] Japanese Patent Application Laid-Open No. 2005-134990
[PLT 3] Japanese Patent Application Laid-Open No. 2010-061103
[PLT 4] Japanese Patent Application Laid-Open No. 2010-272030
[PLT 5] Japanese Patent Application Laid-Open No. H04-213765

Non Patent Literature

[NPL 1] G. Amanatidis, A. Boldyreva, and A. O'Neill, "Provably-secure schemes for basic query support in outsourced databases" in S. Barker and G.-J. Ahn, editors, DBSec, volume 4602 of Lecture Notes in Computer Science, pages 14-30, Springer, 2007.

SUMMARY OF INVENTION

Technical Problem

As described above, using the method of the searchable encryption described in NPL 1, it is possible to perform linking between tables in a state where the tables are kept encrypted and extract a row which matches a certain condition (an element in a specific column being coincident with a designated value).

However, in this method, the tables are linked in terms of also a row other than the one to be obtained finally. With respect to the above-described example, it is necessary for the user to be able to know only the expiration date of a credit card held by "Ueda", but not an expiration date for any other member. Nevertheless, the tables shown in FIG. 11 and FIG. 15 are generated, in which the expiration dates for other members than "Ueda" are linked.

Because this kind of database system is generally operated by a client-server method, and the data in the tables shown in FIGS. 11 and 15, in which the expiration dates for other members than "Ueda" are linked, is kept stored in a device on the server side while this process is performed, the risk of the data leaking out during the time period cannot be denied.

When each piece of the data is encrypted as shown in FIG. 15, a user not having the set of secret keys (K, k) cannot know any specific name or expiration date. But the user can estimate at least a relationship between cryptograms from the linking relation. That is, a link of the tables in terms of a row other than the one to be obtained finally means that there is the risk of information leakage occurring to an extent more than necessary about the correlation within the data.

Any technology capable of solving this problem is not disclosed even in the above-mentioned PTLs 1 to 5. Because no one among these PTL documents refers to the problem explained above from the start, the technologies described in these documents cannot solve the problem naturally.

An object of the present invention is to provide an encrypted database system, a client terminal, a database server, a data linking method and a program which links between a plurality of encrypted tables in a database without decrypting them and further to enable to prevent the risk of unnecessary leaking out of data.

Solution to Problem

To achieve the object, an encrypted database system according to the invention includes: a client terminal which encrypts, by the use of a secret key stored in advance, the whole of data in a first table having a plurality of pieces of data in a-th column and b-th column and to a second table having a plurality of pieces of data in c-th column, both of the tables being inputted from the outside respectively, outputs them, and sends a partial link command to perform linking between these tables, with respect to row whose value of the a-th column data stocked in advance is within a designated range equal to or greater than p and lower than q, so as to perform linking between rows whose values of the b-th column data stocked in advance and the c-th column data stocked in advance are equal to the outside along with a range search key generated from the secret key, the encrypted database server which receives the encrypted first and second tables, storing them, and having a partial link function for performing linking between the encrypted first and second tables, with respect to row whose value of the a-th column data stocked in advance is within a designated range equal to or greater than p and lower than q, so as to perform linking between rows whose values of the b-th column data stocked in advance and the c-th column data stocked in advance are equal, and sending back them to the client terminal according to the partial link command; wherein the client terminal and the encrypted database server are connected with each other; the partial link function of the encrypted database server extracts, from the encrypted first table, the row whose value of a-th column data stocked in advance is within a designated range equal to or greater than p and lower than q by the use of the range search key, and, with respect to the extracted row, links rows whose value of the b-th column data stocked in advance in the encrypted first table and value of the c-th column data stocked in advance in the encrypted second table are equal.

To achieve the object, a client terminal according to the invention includes: an encryption unit which encrypts the whole of data in a first table having a plurality of pieces of data in a-th column and b-th column and in a second table having a plurality of pieces of data in c-th column, both of the tables being inputted from the outside, by the use of a secret key stored in advance, and outputs them to the outside; and a range search key generation unit which generates a range search key by the use of the secret key, wherein the range search key generation unit has a function for sending, to the outside along with the range search key, a partial link command to perform linking between the first and second tables, by the use of the secret key, with respect to row in the encrypted first table whose value of a-th column data stocked in advance is within a designated range equal to or greater than p and lower than q, so as to perform linking between rows whose values of b-th column data stocked in advance and the c-th column data stocked in advance are equal.

To achieve the object, an encrypted database server according to the invention has a partial link function for receiving, from a client terminal, and storing a first table having a plurality of pieces of data in a-th column and b-th column and a second table having a plurality of pieces of data in c-th column, both of the tables having been wholly encrypted, for performing linking between the first and second encrypted tables, according to a partial link command including a range search key received from the client terminal, with respect to row in the encrypted first table whose value of the a-th column data stocked in advance is within a designated range equal to or greater than p and lower than q, so as to perform linking rows whose values of the b-th column data stocked in advance and the c-th column data stocked in advance are equal, and for sending back them to the client terminal, wherein the partial link function is performed by a search unit which extracts, from the encrypted first table, row whose value of the a-th column data stocked in advance is within a designated range equal to or greater than p and lower than q by the use of the range search key, and, with respect to the extracted row, links row whose values of the b-th column data stocked in advance and the c-th column data stocked in advance are equal.

To achieve the object, an encrypted data linking method for an encrypted database system according to the invention includes: a client terminal and an encrypted database server which are connected with each other, wherein: the client terminal encrypts the whole of data in a first table having a plurality of pieces of data in a-th column and b-th column and in a second table having a plurality of pieces of data in c-th column, both of the tables being inputted from the outside, by the use of a secret key stored in advance, and outputs them to the encrypted database server; the encrypted database server receives and stores the encrypted first and second tables; the client terminal sends, to the encrypted database server along with a range search key generated from the secret key, a partial link command to perform linking between the first and second tables, with respect to row in the encrypted first table whose value of a-th column data stocked in advance is within a designated range equal to or greater than p and lower than q, so as to perform linking between rows whose values of the b-th column data stocked in advance and the c-th column data stocked in advance are equal; and the encrypted database server extracts, from the encrypted first table, row whose value of the a-th column data stocked in advance is within a designated range equal to or greater than p and lower than q by the use of the range search key, with respect to the extracted rows, links between rows whose values of the b-th column data stocked in advance and the c-th column data stocked in advance are equal, and sends back them to the client terminal.

To achieve the object, a computer readable non-transitory medium embodying an encrypted data linking program in an encrypted database system according to the invention includes: a client terminal and an encrypted database server which are connected with each other, the program causing a computer equipped with the client terminal to perform a method, said method includes: encrypting the whole of data in a first table having a plurality of pieces of data in a-th column and b-th column and in a second table having a plurality of pieces of data in c-th column, both of the tables being inputted from the outside, by the use of a secret key stored in advance, and outputting them to the encrypted database server; and sending, to the encrypted database server along with a range search key generated from the secret key, a partial link command to perform linking between the first and second tables, with respect to row in the encrypted first table whose value of the a-th column data stocked in advance is within a designated range equal to or greater than p and lower than q, so as to perform linking between rows whose values of the b-th column data stocked in advance and the c-th column data stocked in advance are equal.

To achieve the object, a computer readable non-transitory medium embodying an encrypted data linking program in an encrypted database system according to the invention includes: a client terminal and an encrypted database server which are connected with each other, the program causing a computer equipped with the encrypted database server to perform a method, said method includes: receiving, from the client terminal, and storing a first table having a plurality of pieces of data in a-th column and b-th column and a second table having a plurality of pieces of data in c-th column, both of the tables having been wholly encrypted; and according to a partial link command including a range search key received from the client terminal, extracting, from the encrypted first table, row whose value of the a-th column data stocked in advance is within a designated range equal to or greater than p and lower than q by the use of the range search key, and, with respect to the extracted rows, linking between rows whose values of the b-th column data stocked in advance and the c-th column data stocked in advance are equal, and sending back them to the client terminal.

Advantageous Effects of Invention

As described above, because the present invention is configured such that a database server determines and extracts elements in a first and a second tables having a value equal to or greater than p and lower than q by using a range search key generated from a search key at a client terminal, then performs linking between the first and second tables in terms of only columns of them, and sends back it to the client terminal, each table is not decrypted and a link is not performed with unnecessary data.

As a result, it becomes possible to provide an encrypted database system, a client terminal, a database server, a data linking method and a program which have excellent features that they can perform linking between a plurality of encrypted tables in a database without decrypting them and further prevent the risk of leakage of data which is other than that necessary for the user.

BRIEF DESCRIPTION OF DRAWINGS

FIG. 3 An explanatory diagram showing the table "X" before encrypted shown in FIG. 2.

FIG. 5 An explanatory diagram showing an encrypted table "X" encrypted from the table "X" shown in FIG. 3 by the process shown in FIG. 2.

FIG. 12 An explanatory diagram showing a table "III" resulting from extraction of a row having a value "Ueda" in the column "IA (name)" from the table "III" shown in FIG. 11.

FIG. 16 An explanatory diagram showing an encrypted table "III" resulting from extraction of a row having a value "Hash(K, Ueda)" in the column "IA (name)" from the encrypted table "III" shown in FIG. 15.

DESCRIPTION OF EMBODIMENTS

Exemplary Embodiment

Figure 1:
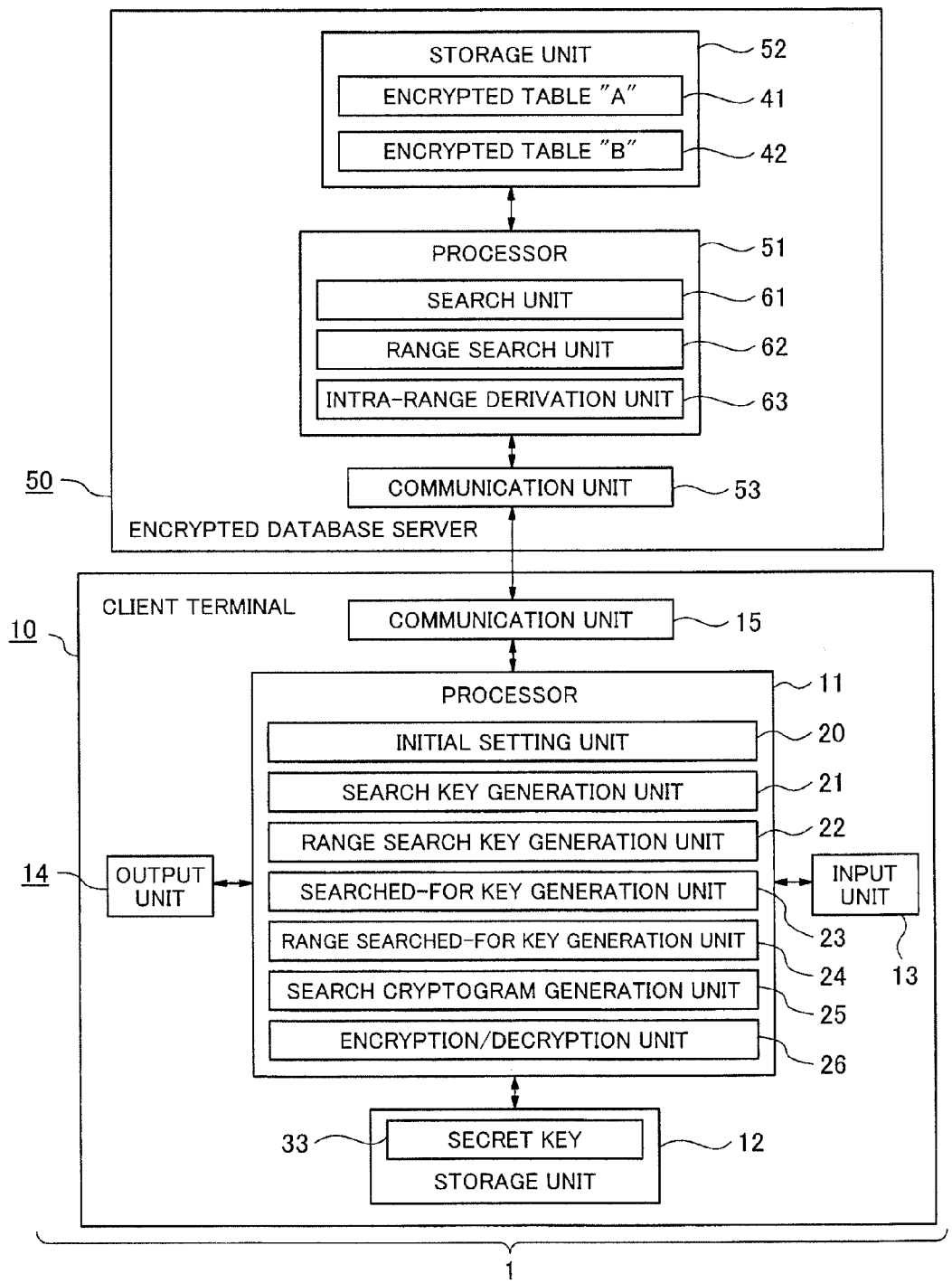
FIG. 1 An explanatory diagram showing a configuration of an encrypted database system according to an exemplary embodiment of the present invention.

Hereinafter, a configuration of an exemplary embodiment of the present invention will be described, on the basis of accompanying drawings FIGS. 1, 2, and 7.

Basic content of the exemplary embodiment will be described first, and more specific content will be described after that.

An encrypted database system 1 according to the invention includes: a client terminal 10 which encrypts, by the use of a secret key stored in advance, the whole of data in a first table having a plurality of pieces of data in a-th column and b-th column and to a second table having a plurality of pieces of data in c-th column, both of the tables being inputted from the outside respectively, outputs them, and sends a partial link command to perform linking between these tables, with respect to row whose value of the a-th column data stocked in advance is within a designated range equal to or greater than p and lower than q, so as to perform linking between rows whose values of the b-th column data stocked in advance and the c-th column data stocked in advance are equal to the outside along with a range search key generated from the secret key, the encrypted database server 50 which receives the encrypted first and second tables, storing them, and having a partial link function for performing linking between the encrypted first and second tables, with respect to row whose value of the a-th column data stocked in advance is within a designated range equal to or greater than p and lower than q, so as to perform linking between rows whose values of the b-th column data stocked in advance and the c-th column data stocked in advance are equal, and sending back them to the client terminal 10 according to the partial link command; wherein the client terminal 10 and the encrypted database server 50 are connected with each other; the partial link function of the encrypted database server 50 extracts, from the encrypted first table, the row whose value of a-th column data stocked in advance is within a designated range equal to or greater than p and lower than q by the use of the range search key, and, with respect to the extracted row, links rows whose value of the b-th column data stocked in advance in the encrypted first table and value of the c-th column data stocked in advance in the encrypted second table are equal.

The client terminal 10 includes: a search key generation unit 21 which generates, by the use of the secret key, a search key which is a key for searching for an element in the b-th column of the first table; a searched-for key generation unit 23 which generates, by the use of the secret key, a searched-for key which is a key for being searched for an element having a specific value in the c-th column of second table; a range searched-for key generation unit 24 which generates, by the use of the secret key, a range searched-for key which is a key for being searched for an element having a specific value equal to or greater than p and lower than q in the a-th column of the first table; an encryption unit (encryption/decryption unit 26) which encrypts each element in the first and second tables by the use of the secret key; and a range search cryptogram generation unit 25 which generates, by the use of the secret key and the search key, a range search cryptogram which is information for correlating an element in the a-th column of the first table to the search key, and wherein the client terminal encrypts the first and second tables by these units. The encryption unit 26 has a function for replacing an element in the a-th column of the first table with the range searched-for key and the element in the encrypted a-th column, and an element in the b-th column of the first table with the range search cryptogram and the element in the encrypted b-th column, for replacing an element in the c-th column of the second table with the searched-for key and the element in the encrypted c-th column, and for sending them to the encrypted database server as the encrypted first and second tables. The client terminal includes: a range search key generation unit 22 which generates, by the use of the secret key, a range search key which is a key for searching for an element having a specific value equal to or greater than p and lower than q in the a-th column of the first table, and sends the range it to the encrypted database server along with the partial link command.

The encrypted database server 50 includes: a range search unit 62 which extracts a row for which the range search key coincides with the range searched-for key in the encrypted first table; an intra-range derivation unit 63 which generates a subject search key, with respect to the extracted row, from the range search key and the range search cryptogram; and a search unit 61 which finds, by the use of the subject search key and the searched-for key, a row in the encrypted second table corresponding to the extracted row in the encrypted first table, and performs linking between these rows, and wherein the encrypted database server performs the partial link function by these units.

With this configuration, the encrypted database system 1 can perform linking between a plurality of encrypted tables in the database without decrypting them, and also prevent the risk of leakage of data which is other than that necessary for the user.

This will be described in more detail below.

FIG. 1 is an explanatory diagram showing a configuration of the encrypted database system 1 according to the exemplary embodiment of the present invention. The encrypted database system 1 includes the client terminal 10 and the encrypted database server 50 each being connected with the other via a LAN (Local Area Network) or the like.

The client terminal 10 has a configuration as a general computer. That is, the client terminal 10 includes a processor 11 being the subject which executes a computer program, a storage unit 12 for storing data, an input unit 13 for receiving a user's operation, an output unit 14 for presenting a processing result to the user and a communication unit 15 for performing data communication with other computers.

In the processor 11, an initial setting unit 20, a search key generation unit 21, a range search key generation unit 22, a searched-for key generation unit 23, a range searched-for key generation unit 24, a range search cryptogram generation unit 25 and an encryption/decryption unit 25 are configured, each in the form of a computer program, to execute respective ones of functions which will be described later, in response to an operation command from a user. In the storage unit 12, a secret key 33 used in a process which will be described below is stored.

Then, to the input unit 13, a table "X" 31 and a table "Y" 32 whose names are "X" and "Y" respectively, are inputted. Hereafter in the present specification, an element having a value "a" in a column named "A" of a table named "X" will be referred to as an element "a" in a column "A" of a table "X".

The encrypted database server 50 also has a configuration as a general computer. That is, the encrypted database server 50 includes a processor 51 being the subject which executes a computer program, a storage unit 52 for storing data, and a communication unit 53 for performing data communication with other computers.

In the processor 51, a search unit 61, a range search unit 62, and an intra-range derivation unit 62 are configured, each in the form of a computer program, to execute respective ones of functions which will be described later, in response to an operation command from the client terminal 10. In the storage unit 52, also stored are an encrypted table "X" 41 and an encrypted table "Y" 42, which have been obtained by encrypting the table "X" 31 and the table "Y" 32 respectively, sent from the client terminal 10.

Basic operation of each of the above-described unit will be described below. In the client terminal 10 and the encrypted database server 50, various sorts of system variables have been inputted or stored in advance. In the following description, because these system variables are well-known matters to those skilled in the art, their explanations other than necessary will not be particularly given.

First, on the side of the client terminal 10, the initial setting unit 20 sets an initial value required for each unit's operation. Its detail will be described later.

With respect to an arbitrary table "X" with its elements encrypted, an arbitrary column "A" of the table "X", and an arbitrary element "a" in the column "A", the search key generation unit 21 generates, by the use of the secret key 33, a "search key (X, A, a)" which is a key for searching for the element "a" in the column "A" of the table "X". If considered to be a function, the search key generation unit 21 is expressed as a following equation 3.

secret key×table name×column name×element
value→search key [Equation 3]

With respect to an arbitrary table "X" with its elements encrypted, an arbitrary column "A" of the table "X", and an arbitrary element "a" in the column "A", the range search key generation unit 22 generates, by the use of the secret key 33, a "range search key (X, A, a, b) which is a key for searching for an element in the column "A" of the table "X" having a value between a minimum value "a" and a maximum value "b". If considered to be a function, the range search key generation unit 22 is expressed as a following equation 4.

secret key×table name×column name×maximum
value×minimum value→range search key [Equation 4]

With respect to an arbitrary table "X" with its elements encrypted, an arbitrary column "A" of the table "X", and an arbitrary element "a" in the column "A", the searched-for key generation unit 23 generates, by the use of the secret key 33, a "searched-for key (X, A, a)" which is a key for being searched for as the element "a" in the column "A" of the table "X". If considered to be a function, the searched-for key generation unit 23 is expressed as a following equation 5.

secret key×table name×column name×element
value→searched-for key [Equation 5]

With respect to an arbitrary table "X" with its elements encrypted, an arbitrary column "A" of the table "X", and an arbitrary element "a" in the column "A", the range searched-for key generation unit 24 generates, by the use of the secret key 33, a "range searched-for key (X, A, a)" which is a key for being searched for as an element "a" satisfying $b \leq a \leq c$ in terms of any element b satisfying $b \leq a$ and any element c satisfying $a \leq c$ in the column "A" of the table "X". If considered to be a function, the range searched-for key generation unit 24 is expressed as a following equation 6.

secret key×table name×column name×element
value→range searched-for key [Equation 6]

With respect to an arbitrary table "X", an arbitrary column "A" of the table "X", an arbitrary element "a" in the column "A", and a search key "K", the range search cryptogram generation unit 25 generates, by the use of the secret key, a "range search cryptogram (X, A, a, K)" which is information for correlating the element "a" to the search key "K". If considered to be a function, the range search cryptogram generation unit 25 is expressed as a following equation 7.

secret key×table name×row name×element
value→range search cryptogram [Equation 7]

On the side of the encrypted database server 50, the search unit 61 determines whether $a=a'$ or not with respect to between a "searched-for key (X, A, a)" generated for a certain table "X", a certain column "A" of the table "X", and a certain element "a" in the column "A" and a "search key (X, A, a')" generated for an element "a" in the column "A" of the table "X", on the basis of the "search key (X, A, a')" and the "searched-for key (X, A, a)". If considered to be a function, the search unit 61 is expressed as a following equation 8. Here, 0 is considered to mean coincidence, and 1 to mean non-coincidence.

search key=searched-for key:output value=0 search key≠serached-for key:output value=1 [Equation 8]

The range search unit 62 determines whether $a \leq c \leq b$ or not with respect to between a "range searched-for key (X, A, c)" generated for a certain table "X", a certain column "A" of the table "X", and a certain element "c" in the column "A" and a "range search key (X, A, a, b)" generated with respect to a value range from a minimum value "a" to a maximum value "b" in the column "A" of the table "X", on the basis of the "range search key (X, A, a, b)" and the "range searched-for key (X, A, c)". If considered to be a function, the range search unit 62 is expressed as a following equation 9. Here, 0 is considered to mean coincidence, and 1 to mean non-coincidence.

range search key=range searched-for key:output
value=0 range search key≠range searched-for key:output
value=1 [Equation 9]

The intra-range derivation unit 63 derives a search key "K" from a "range search key (X, A, a, b)" generated with respect to a value range from a minimum value "a" to a maximum value "b" in a certain column "A" of a certain table "X", and a "range search cryptogram (X, A, d, K)" generated with respect to an element "d" in the column "A" of the table "X" satisfying $a \leq d \leq b$ and to the search key "K". If considered to be a function, the intra-range derivation unit 63 is expressed as a following equation 10.

range search key×range search cryptogram→search
key [Equation 10]

Returning to the side of the client terminal 10, the encryption/decryption unit 26 decrypts a cryptogram c by the secret key. The encryption/decryption unit 26 can also encrypt an element m by the secret key in an opposite manner. If considered to be a function, the encryption/decryption unit 26 is expressed as following equations 11 and 12.

$$\text{secret key} \times \text{element} \rightarrow \text{cryptogram} \quad \text{[Equation 11]}$$

$$\text{secret key} \times \text{cryptogram} \rightarrow \text{decryption result} \quad \text{[Equation 12]}$$

(Creation and Sending of Encrypted Tables)

Figure 2:
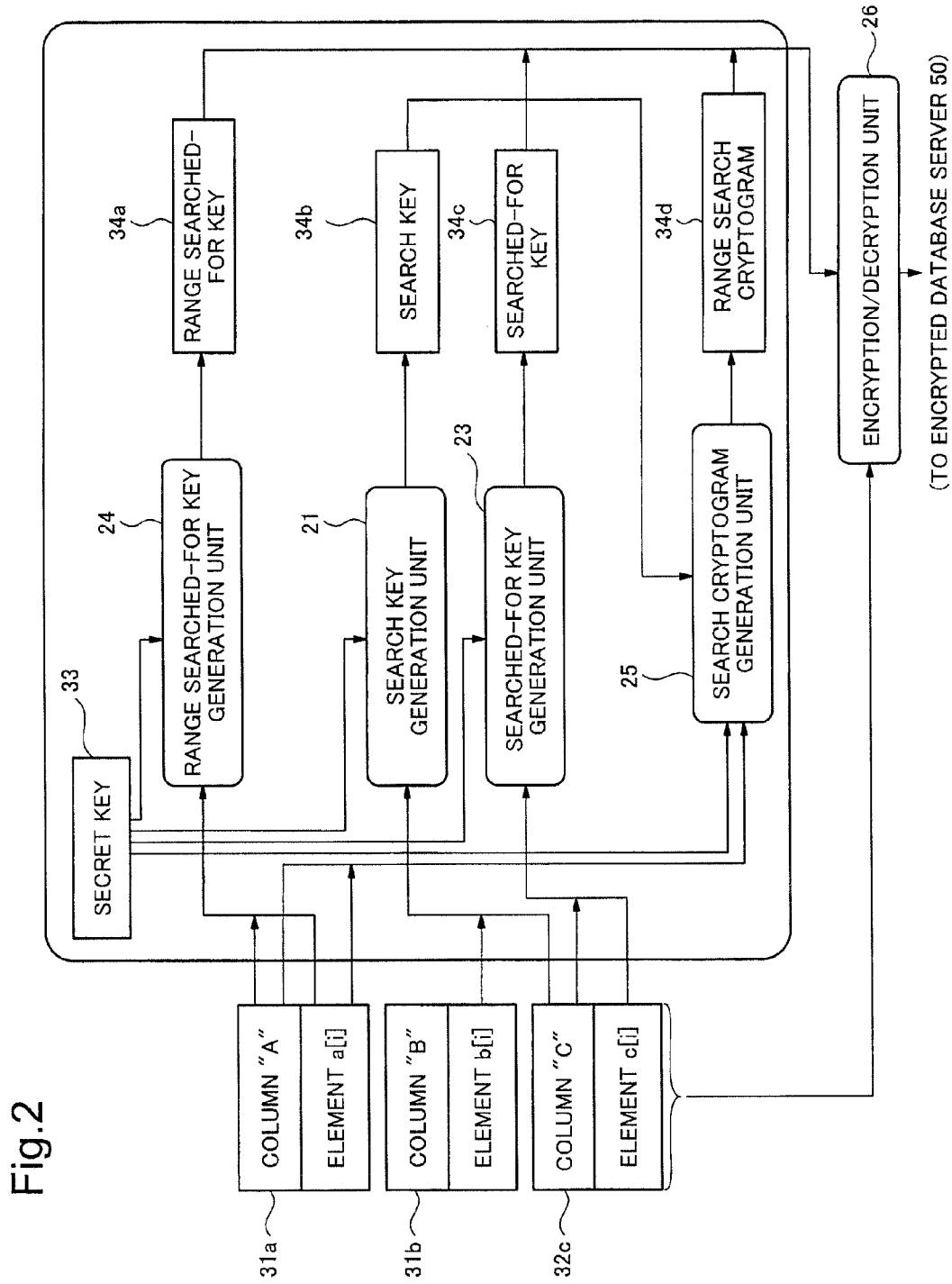
FIG. 2 An explanatory diagram showing operation, performed by a client terminal shown in FIG. 1, of encrypting a table "X" and a table "Y" and sending them to an encrypted database server.
Figure 3:
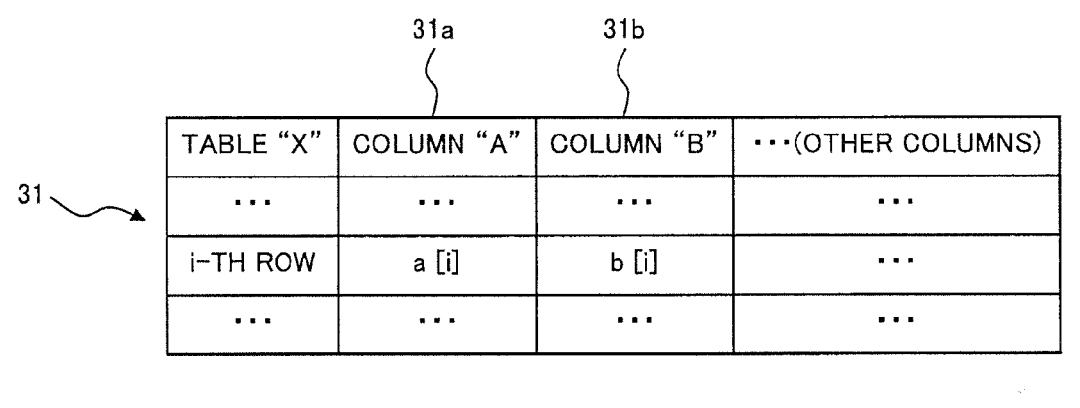
Figure 4:
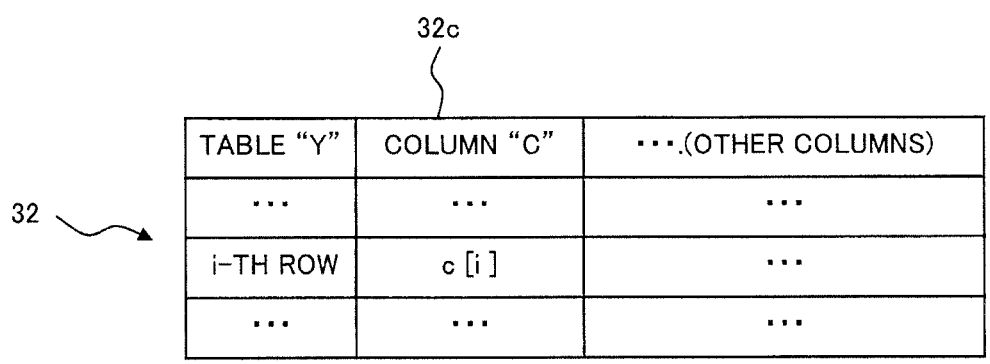
FIG. 4 An explanatory diagram showing the table "Y" before encrypted shown in FIG. 2.

FIG. 2 is an explanatory diagram illustrating operation, by the client terminal 10 shown in FIG. 1, of encrypting the table "X" 31 and the table "Y" 32 and then sending them to the encrypted database server 50. FIGS. 3 and 4 are explanatory diagrams showing the table "X" 31 and the table "Y" 32 before the encryption, which have already been shown in FIG. 2. FIG. 3 shows the table "X" 31, and FIG. 4 shows the table "Y" 32.

As for the table "X" 31 and the table "Y" 32 which are inputted to the client terminal 10 via the input unit 13, a column "A" 31a and a column "B" 31b exist in the table "X" 31, and a column "C" 32c exists in the table "Y" 32. The range taken by values in the column "B" 31b is the same as that by values in the column "C" 32c.

The number of rows of the table "X" 31 is a natural number n, and the i-th element ($1 \leq i \leq n$) in the column "A" 31a and that in the column "B" 31b, of the table "X" 31, will be referred to as "a[i]" and "b[i]", respectively. The number of rows of the table "Y" 32 is a natural number m, and the i-th element ($1 \leq i \leq n$) in the column "C" 32c of the table "Y" 32 will be referred to as "c[i]".

With respect to every value from 1 to n, which i can take, the range searched-for key generation unit 24 generates a "range searched-for key (X, A, a[i])" expressed by the equation 6, from the table "X" 31, the column "A" 31a, the element "a[i]" and the secret key 33. It is expressed as a range searched-for key 34a in FIG. 2.

With respect to every value from 1 to n, which i can take, the search key generation unit 21 generates a "search key (Y, C, b[i])" expressed by the equation 3, from the table "Y" 32, the column "C" 32c, the element "b[i]" and the secret key 33. It is expressed as a search key 34b in FIG. 2.

With respect to every value from 1 to n, which i can take, the range search cryptogram generation unit 25 generates a "range search cryptogram (X, A, a[i], search key (Y, C, b[i]))" expressed by the equation 7, from the table "X" 31, the column "A" 31a, the element "a[i]" and the secret key 34b. It is expressed as a range search cryptogram 34d in FIG. 2.

With respect to every value from 1 to n, which i can take, the encryption/decryption unit 26 generates a cryptogram "enc(a[i])", for each element, expressed by the equation 11 from the element "a[i]" and the secret key 33, and similarly generates a cryptogram "enc(b[i])", for each element, expressed by the equation 11 from the element "b[i]" and the secret key 33, Further, with respect to every value from 1 to n, which i can take, the encryption/decryption unit 26 replaces the element "a[i]" in the column "A" 31a of the table "X" 31 with a "range searched-for key (X, A, a[i]), enc(a[i]))", and similarly replaces the element "b[i]" in the column "B" 31b with a "range search cryptogram (X, A, a[i]), search key (Y, C, b[i]), enc(b[i]))". Thus substituted table "X" 31 is represented by the encrypted table "X" 41.

On the other hand, with respect to every value from 1 to m, which i can take, the searched-for key generation unit 23 generates a "searched-for key (Y, C, c[i])" expressed by the equation 5, from the table "Y" 32, the column "C" 32c, the element "c[i]" in the column C and the secret key 33. It is expressed as a searched-for key 34c in FIG. 2.

With respect to every value from 1 to m, which i can take, the encryption/decryption unit 26 generates a cryptogram "enc(c[i])" expressed by the equation 11 from the element "c[i]" and the secret key 33, for each element. Further, with respect to every value from 1 to m, which i can take, the encryption/decryption unit 26 replaces the element "c[i]" in the column "C" 32c of the table "Y" 32 with a "searched-for key (Y, C, c[i]), enc(c[i]))". Thus substituted table "Y" 32 is represented by the encrypted table "Y" 42.

Figure 6:
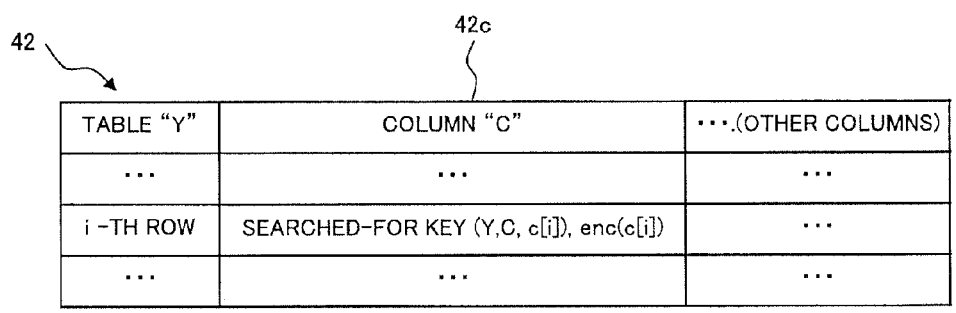
FIG. 6 An explanatory diagram showing an encrypted table "Y" encrypted from the table "Y" shown in FIG. 4 by the process shown in FIG. 2.

The encryption/decryption unit 25 sends the encrypted table "X" 41 and the encrypted table "Y" 42 created as above to the encrypted database server 50. FIGS. 5 and 6 are explanatory diagrams showing the encrypted table "X" 41 and the encrypted table "Y" 42 which are encrypted by the process shown in FIG. 2 from the table "X" 31 shown in FIG. 3 and the table "Y" 32 shown in FIG. 4. FIG. 5 shows the encrypted table "X" 41, and FIG. 6 shows the encrypted table "Y" 42, respectively.

The encrypted database server 50 stores, into the storage unit 52, the encrypted table "X" 41 and the encrypted table "Y" 42 received from the client terminal 10. Then, in response to a command from the client terminal 10, the encrypted database server 50 performs a linking process on the encrypted table "X" 41 and the encrypted table "Y" 42, and sends back a result of the process to the client terminal 10 of requester. The process will be described below.

(Linking Process on Encrypted Tables)

Here, it is considered that linking is performed with respect to data for which an element "b[i]" in the column "B" of the encrypted table "X" 41 and an element "c[i]" in the column "C" of the encrypted table "Y" 42 have the same value. More specifically, it will be described below that, in the present exemplary embodiment, a process of extracting a row for which the value in the column "A" 31a of the encrypted table "X" 41 is equal to or greater than p and lower than q, from an encrypted table obtained by linking the encrypted table "X" 41 with the encrypted table "Y" 42, is performed in a manner where actual linking is not made between the whole body of the encrypted table "X" 41 and that of the encrypted table "Y" 42.

By designating a value range such as "equal to or greater than p and lower than q", it generally becomes possible to generate a table for limited values in the column "A" 31a from the encrypted table linked the encrypted table "X" 41 with the encrypted table "Y" 42. This kind of linking process will be referred to as "partial link" in the present description.

The client terminal 10 holds the secret key 33 which is used when the encryption is performed to encrypt the encrypted table "X" 41 and the encrypted table "Y" 42, but the encrypted database server 50 does not hold it.

Figure 7:
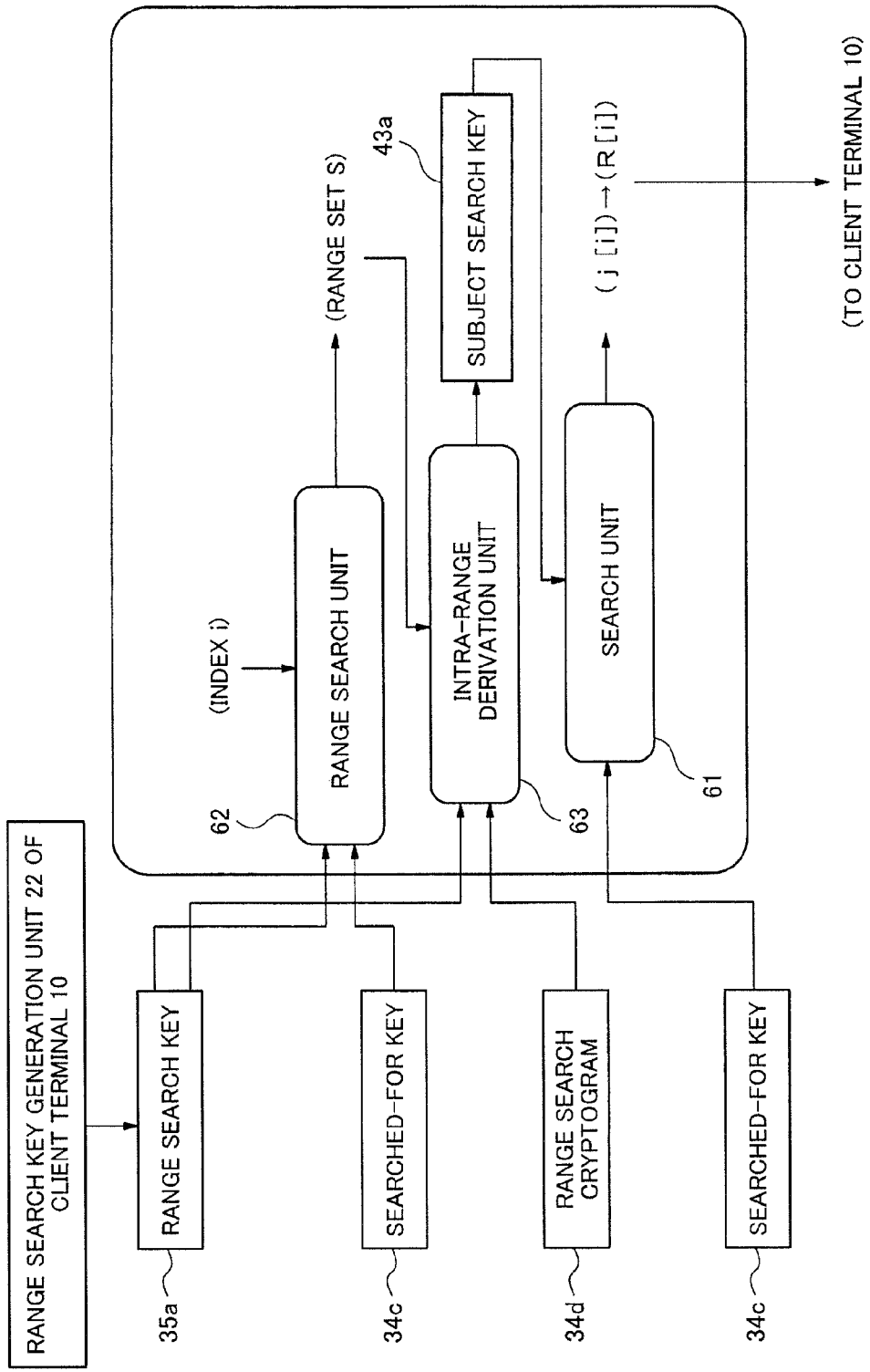
FIG. 7 An explanatory diagram showing a process, performed by an encrypted database server shown in FIG. 1, of linking the encrypted table "X" and the encrypted table "Y" shown in FIG. 5 to FIG. 6 and then extracting a row having a value equal to or greater than p and lower than q in the column "A".

FIG. 7 is an explanatory diagram showing a process, performed by the encrypted database server 50 shown in FIG. 1, of linking the encrypted table "X" 41 shown in FIG. 5 with the encrypted table "Y" 42 shown in FIG. 6 and then extracting rows having a value equal to or greater than p and lower than q in the column "A". First, the range search key generation unit 22 of the client terminal 10 generates a "range search key (X, A, p, q)" expressed by the equation 4, from the table "X" 31, the column "A" 31a, a minimum value p, a maximum value q and the secret key 33.

The "range search key (X, A, p, q)" is sent from the client terminal 10 to the encrypted database server 50, along with a partial link command. It is expressed as a range search key 35a in FIG. 7.

In the encrypted database server 50 having received them, the range search unit 62 finds all i values for which the range search key 35a coincides with the range searched-for key 34a=(X, A, a[i]), which is an element in the column "A" 31a of the encrypted table "X" 41. A set of such i values is referred to as a range set S. Here, if i∈S, then a[i]=q.

With respect to every i value being an element of the range set S, the intra-range derivation unit 63 obtains a subject search key 43a=search key (Y, C, b[i]) from the range search key 35a=(X, A, p, q) and the range search cryptogram 34d= (X, A, a[i], search key (Y, C, b[i])).

With respect to every i value being an element of the set S, the search unit 61 finds a value of j for which the subject search key 43a coincides with the searched-for key 34c=(Y, C, c[j]), which is an element in the column "C" 32c of the encrypted table "Y" 42. Such a j value satisfying the above condition is referred to as j[i].

Then, the search unit 61 links the i-th row of the encrypted table "X" 41 with the j[i]-th row of the encrypted table "Y" 42, creates a new row R[i], and sends back R[i] with respect to every value of i∈S to the client terminal 10.

By decrypting enc(a[i]), enc(b[i]) and enc(c[i]) which are elements of R[i], the client terminal 10 can obtain the original texts a[i], b[i] and c[i] for the elements in the respective columns by the use of the encryption/decryption unit 26. Further, when an appropriate search cryptogram 34d is created in advance, it is also possible to make further linking between the column "C" and still another column, using the subject search key 43a=search key (Y, C, b[i]).

More Detail Description of Exemplary Embodiment

Operation of each of the above-described unit will be described in more detail. Hereafter, an element Val will be represented by an n-digit bit string using t[i] which satisfies t∈{0, 1}, as expressed by a following equation 13.

$$Val = \sum_{i=0}^{n-1} t[i]2^i := (t[0], \ldots, t[n-1])$$ [Equation 13]

Figure 8:
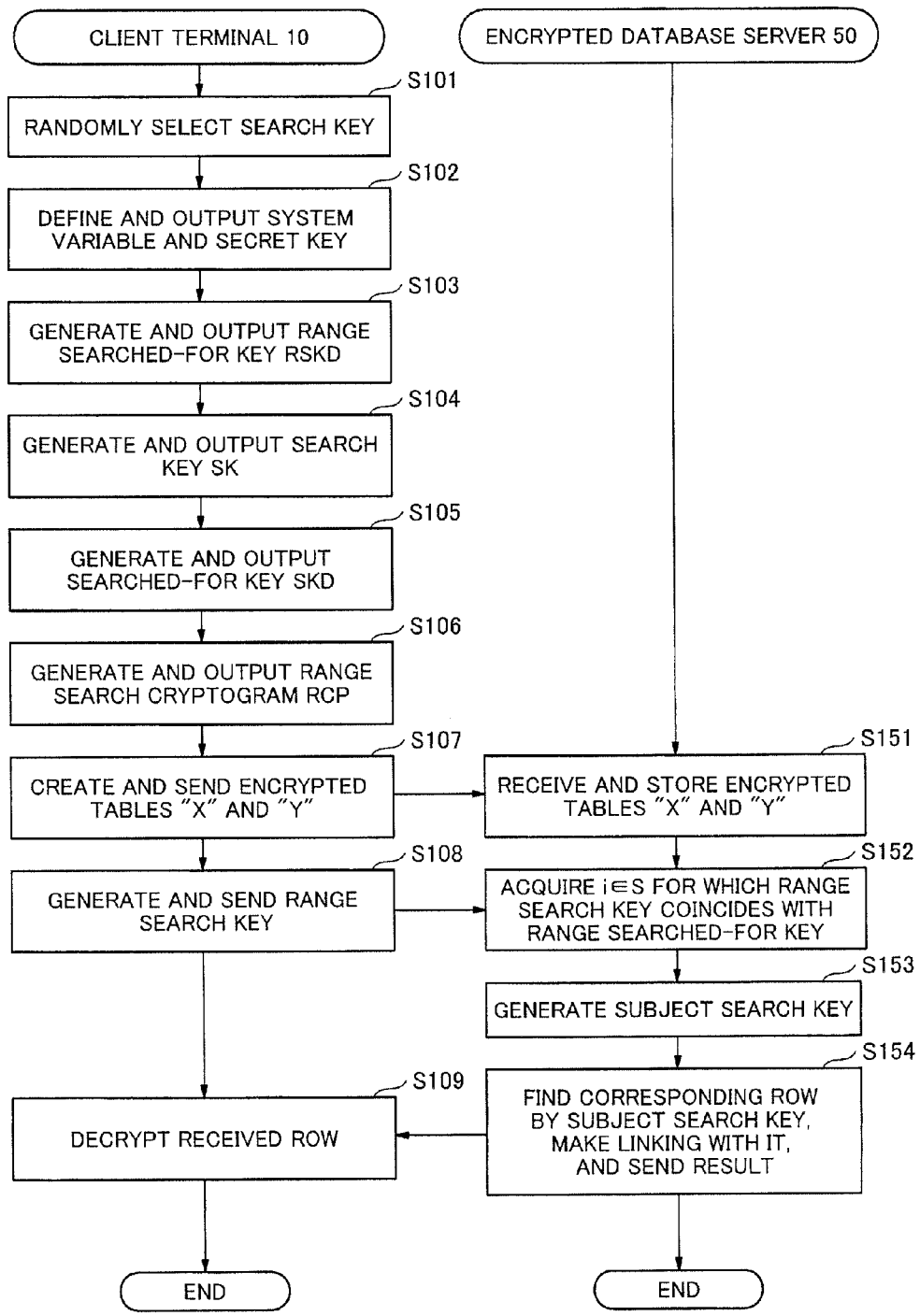
FIG. 8 A flow chart showing a process performed by the client terminal and the encrypted database server shown in FIG. 1.
Figure 9:
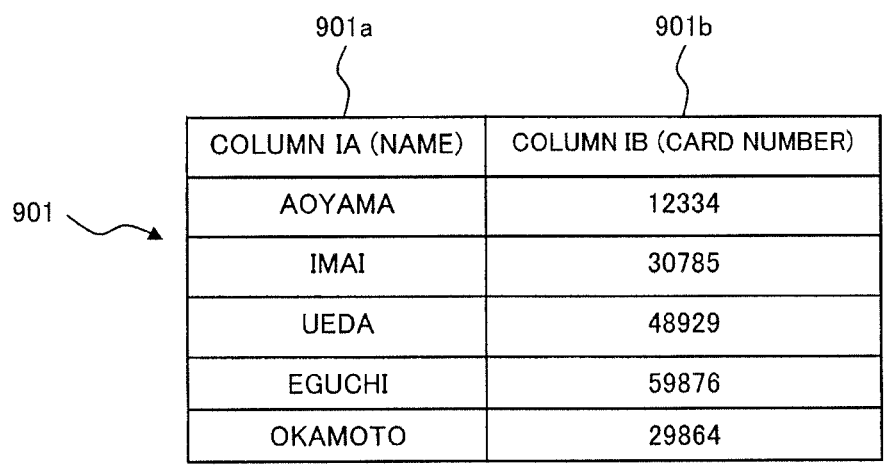
FIG. 9 An explanatory diagram showing a table "I" before linking, in a case of the searchable encryption method, which is an existing technology.
Figure 10:
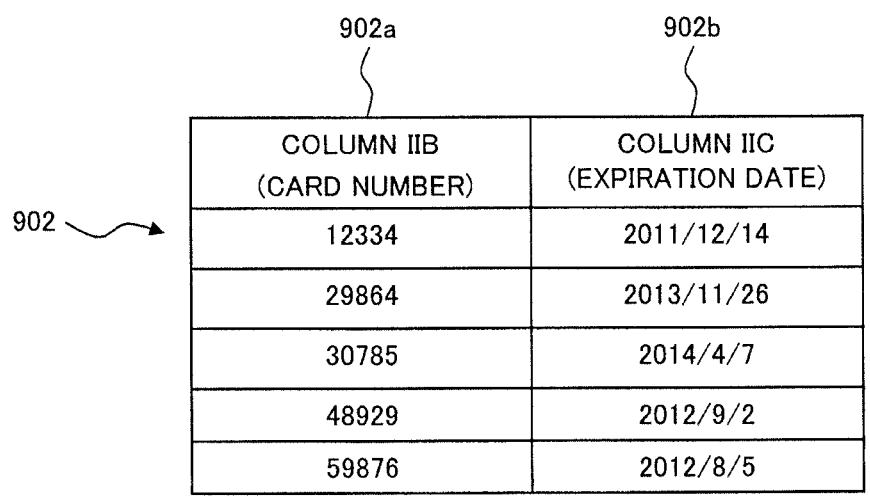
FIG. 10 An explanatory diagram showing a table "II" before linking, in the case of the searchable encryption method, which is an existing technology.
Figure 11:
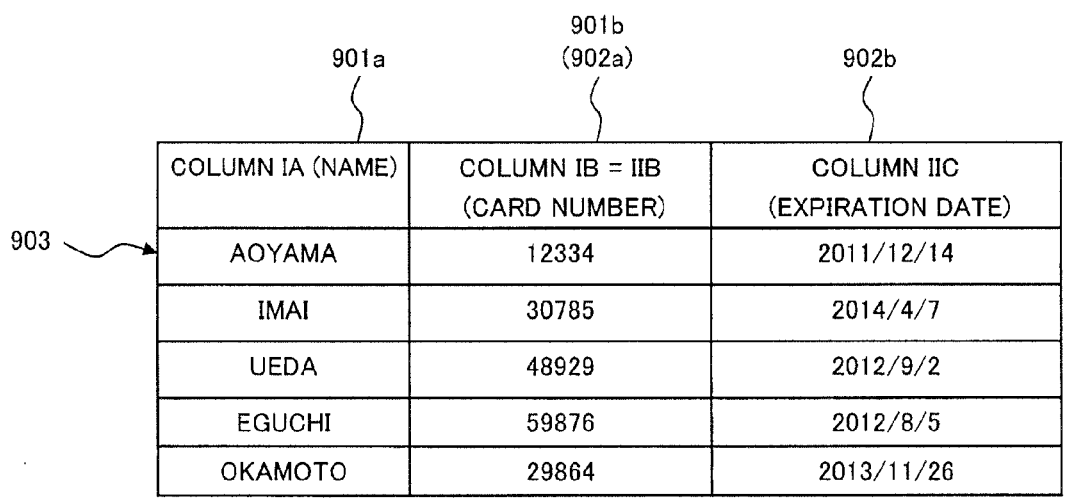
FIG. 11 An explanatory diagram showing a table "III" obtained by linking the table "I" shown in FIG. 9 with the table "II" shown in FIG. 10.
Figure 13:
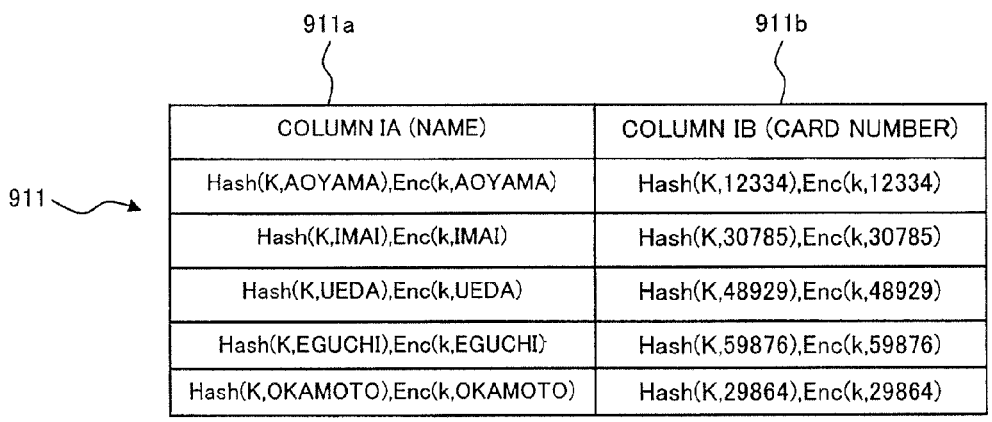
FIG. 13 An explanatory diagram showing an encrypted table "I" resulting from encryption of the table "I" shown in FIG. 9 by the searchable encryption method.
Figure 14:
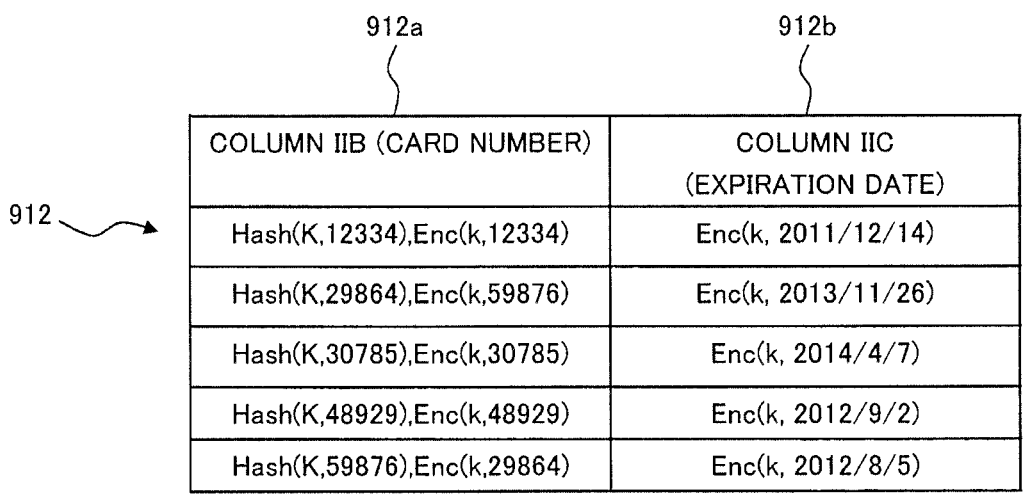
FIG. 14 An explanatory diagram showing an encrypted table "II" resulting from encryption of the table "II" shown in FIG. 10 by the searchable encryption method.
Figure 15:
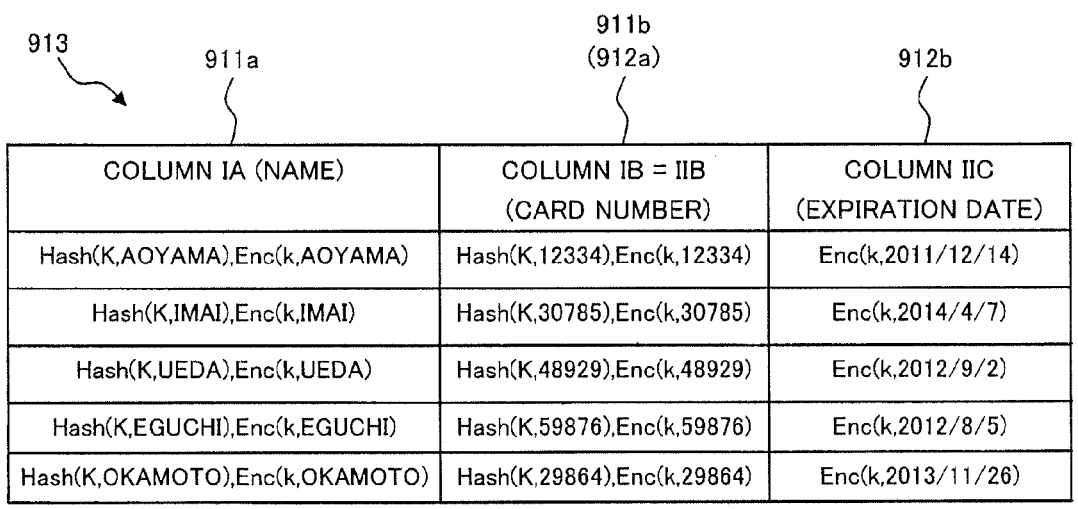
FIG. 15 An explanatory diagram showing an encrypted table "III" obtained by linking the encrypted table "I" 911 shown in FIG. 13 with the encrypted table "II" 912 shown in FIG. 14.

FIG. 8 is a flowchart illustrating processes performed by the client terminal 10 and the encrypted database server 50 shown in FIG. 1. On the side of the client terminal 10, the initial setting unit 20 randomly selects a secret key MK expressed by a following equation 14 from a safety variable κ inputted via the input unit 13 (step S101).

$$\text{secret key} MK \in \{0,1\}\kappa$$ [Equation 14]

The initial setting unit 20 further defines a system variable PM as a description of a method for expressing a hash function represented by a following equation 11, a space of table name, a space of column name and a space of column element, and outputs the system variable PM and the secret key MK (step S102).

$$\text{Hash function Hash: } \{0,1\}\kappa \times \{0,1\}^* \to \{0,1\}\kappa$$ [Equation 15]

Using, as input, the system variable PM, the secret key MK, a table name TN ("X" and "Y" in FIGS. 3 and 4), a column name CN ("A", "B", and "C" in FIGS. 3 and 4) and an element value EV ("a[i]", "b[i]" and "c[i]" in FIGS. 3 and 4)=(c[0], ..., c[n−1]), the range searched-for key generation unit 24 firstly selects I∈{0, 1}^κ at random, subsequently generates each value expressed by a following equation 16 with respect to i=0, ..., n−1, assuming d[n]=0, and finally outputs a range searched-for key RKSD (step S103).

$$d[i]=\text{Hash}(MK,(3,TN,CN,d[i+1],t[i]))$$

$$h[i]=\text{Hash}(d[i],(6,TN,CN,I))$$

$$e[i]=\text{Hash}(MK,(2,TN,CN,d[i+1]))+t[i] \bmod 3$$

$$f[i]=\text{Hash}(d[i+1],(3,TN,CN))+e[0,i] \bmod 3$$

$$RSKD=(I,(h[0],\ldots,h[n-1]),(f[0],\ldots,f[n]))$$ [Equation 16]

Using, as input, the system variable PM, the secret key MK, a table name TN, a column name CN and an element value EV, the search key generation unit 21 generates and outputs a search key SK expressed by a following equation 17 (step S104).

$$SK=\text{Hash}(MK,(1,TN,CN,EV))$$ [Equation 17]

Using, as input, the system variable PM, the secret key MK, a table name TN, a column name CN and an element value EV, the searched-for key generation unit 23 generates and outputs a searched-for key SKD expressed by a following equation 18 (step S105).

$$SKD=\text{Hash}(MK,(5,TN,CN,EV))$$ [Equation 18]

Using, as input, the system variable PM, the secret key MK, a table name TN, a column name CN and an element value EV=(c[0], ..., c[n−1]), a search key SK and a permission key GT, the range search cryptogram generation unit 25 firstly selects I∈{0, 1}^κ at random, subsequently generates each value expressed by a following equation 19 with respect to i=0, ..., n−1, and finally outputs a range search cryptogram RCP (step S106). In addition, d[i] in the equation 19 is equal to that generated by the range searched-for key generation unit 24.

$$g[i]=\text{Hash}(MK,(4,d[i]))$$

$$m[i]=\text{Hash}(g[i],(8,I))\oplus SK$$

$$RCP=(I,m[0],\ldots,m[n-1])$$ [Equation 19]

As already described (as shown in FIGS. 5 and 6), the encryption/decryption unit 25 replaces each element in the table "X" 31 and in the table "Y" 32, and thereby creates the encrypted table "X" 41 and the encrypted table "Y" 42 (step S107). Then, the encryption/decryption unit 25 sends the encrypted table "X" 41 and the encrypted table "Y" 42 to the encrypted database server 50. The encrypted database server 50 receives them and stores them into the storage unit 52 (step S151).

Subsequently, in the client terminal 10, using, as input, the system variable PM, the secret key MK, a table name TN, a column name CN, a minimum element value Min=(a[0], ..., a[n−1]) and a maximum element value Max=(b[0], ..., b[n−1]), the range search key generation unit 22 firstly selects I∈{0, 1}^κ at random, searches for a minimum value of L giving (a[L], ..., a[n−1])=(b[L], ..., b[n−1]), generates each value with respect to i=L, ..., n−1 as d[n]=0 by performing a process represented by a following equation 20, finally outputs a range search key RSK, and sends to the encrypted database server 50 along with a partial link command (step S108).

$$d[0, i] = \text{Hash}(MK, (3, TN, CN, d[i + 1], a[i]))$$ [Equation 20]

$$d[1, i] = \text{Hash}(MK, (3, TN, CN, d[i + 1], t[i]))$$

$$e[0, i] = \text{Hash}(MK, (2, TN, CN, d[0, i + 1])) + a[i] \bmod 3$$

-continued $f[0, i] = \text{Hash}(d[0, i+1], (3, TN, CN, I)) + e[0, i] \bmod 3$ $e[1, i] = \text{Hash}(MK, (2, TN, CN, d[1, i+1])) + t[i] \bmod 3$ $f[1, i] = \text{Hash}(d[1, i+1], (3, TN, CN, I)) + e[1, i] \bmod 3$ $g[L] = \text{Hash}(MK, (4, d[L]))$ $RSK =$
$\begin{pmatrix} TN, CN, d[L], \ldots, d[n], d[0,0], \ldots, d[0, L-1], \\ d[1, 0], \ldots d[1, L-1], f[0, 0], \ldots, f[0, L-1], \\ f[1, 0], \ldots, f[1, L-1], g[L] \end{pmatrix}$ In the encrypted database server 50, using, as input, the system variable PM, the range search key 35a, RSK=(TN, CN, I', L, d[L], . . . , d[n], d[0, 0], . . . , d[0, L−1], d[1, 0], . . . , d[1, L−1], f[0, 0], . . . , f[0, L−1], f[1, 0], . . . , f[1, L−1], g[L]) and the range searched-for key RSKD=(I, (h[0], . . . , h[n−1]), (f[0], . . . , f[n])), the range search unit 62 performs a process shown below and thereby outputs a result (Res) being either 0 (coincidence) or 1 (non-coincidence) in a following manner (step S152).

First, the range search unit 62 determines whether h[L]=Hash(d[L], (6, TN, CN, I)) or no. If this does not hold, the range search unit 62 outputs Res=1 and ends the process. If the equation holds, the range search units 62 performs calculation according to a following equation 21, by assuming a (θ, i) pair which takes a minimum i value among all of (θ, i) pairs (θ, i)∈{0, 1}×{0, . . . , L} satisfying h[0, i]=Hash (d[y, i], (6, TN, CN, I)) as (Θ, H).

$e[\Theta, H] = f[\Theta, H] - \text{Hash}(d[\Theta, H+1], (3, TN, CN, I')) \bmod 3$ $e[H] = f[H] - \text{Hash}(d[\Theta, H+1], (3, TN, CN, I)) \bmod 3$  [Equation 21]

Then, when Θ=0, the range search unit 62 determines Res such that Res=0 if (e[H]−e[0, H]=1 mod 3), and Res=1 if (e[H]−e[0, H]=2 mod 3). When Θ=1, the range search unit 62 determines Res such that Res=0 if (e[H]−e[0, H]=2 mod 3), and Res=1 if (e[H]−e[0, H]=1 mod 3). After outputting the Res values, the process by the range search unit 62 is ended.

Using, as input, the system variable PM, the range search key RSK=(TN, CN, I', L, d[L], . . . , d[n], d[0, 0], . . . , d[0, L−1], d[1, 0], . . . , d[1, L−1], f[0, 0] . . . , f[0, L−1], f[1, 0], . . . , f[1, L−1], g[L]) and the range search cryptogram RCP=(I, m[0], . . . , m[n−1]), the intra-range derivation unit 63 performs a process represented by a following equation 22, and thereby generates and outputs a subject search key SK' (step S153).

$SK' = m[i] \oplus \text{Hash}(g[i], (8, I))$  [Equation 22]

Then, using the subject search key SK' thus calculated, the search unit 61 finds a value of j giving SK'=SKD with respect to every value of i ∈S, using, as input, the subject search key SK', the system variable PM and the searched-for key SKD= (Y, C, c[j]), links the i-th row of the encrypted table "X" 41 with the j[i]-th row of the encrypted table "Y" 42, thereby creating a new row R[i], and sends back R[i] for every value of i ∈S to the client terminal 10 (step S154).

The client terminal 10 links the table "X" 31 with the table "Y" 32 and acquires a row having a value equal to or greater than p and lower than q in the column "A" when the encryption/decryption unit 26 decrypts R[i] by the use of the secret key 33 (step S109).

(General Operation of the First Exemplary Embodiment)

Next, general operation of the above-described exemplary embodiment will be described. An encrypted data linking method for an encrypted database system according to the present exemplary embodiment includes: a client terminal and an encrypted database server which are connected with each other, wherein: the client terminal encrypts the whole of data in a first table having a plurality of pieces of data in a-th column and b-th column and in a second table having a plurality of pieces of data in c-th column, both of the tables being inputted from the outside, by the use of a secret key stored in advance, and outputs them to the encrypted database server (FIG. 8, steps S101 to S107); the encrypted database server receives and stores the encrypted first and second tables (FIG. 8, step S151); the client terminal sends, to the encrypted database server along with a range search key generated from the secret key, a partial link command to perform linking between the first and second tables, with respect to row in the encrypted first table whose value of a-th column data stocked in advance is within a designated range equal to or greater than p and lower than q, so as to perform linking between rows whose values of the b-th column data stocked in advance and the c-th column data stocked in advance are equal (FIG. 8, step S108); and the encrypted database server extracts, from the encrypted first table, row whose value of the a-th column data stocked in advance is within a designated range equal to or greater than p and lower than q by the use of the range search key, with respect to the extracted rows, links between rows whose values of the b-th column data stocked in advance and the c-th column data stocked in advance are equal, and sends back them to the client terminal (FIG. 8, steps S152 to S154).

Here, each of the above-described operation steps may be programmed into computer-executable programs and thereby executed by the client terminal 10 or the encrypted database server 50, which are computers to directly execute the above-described steps. Those programs may be recorded in a non-transitory recording medium, for example, a DVD, a CD, a flash memory or the like. In that case, the programs are read from the recording medium and executed by the computers.

By the above-described operation, the present exemplary embodiment exhibits the following effect.

In the present exemplary embodiment, a range search cryptogram RCP can derive a search key SK by taking the giving of a range search key RSK as a cue. Here, although a range search cryptogram RCP cannot be unconditionally given a cue by a range search key RSK, it can be given a cue when it is generated using an element within a range designated by the RSK.

That is, as shown in the example of linking described above, it becomes possible, depending on whether or not the value of an element in a certain column of one of two tables belongs to a specific range, to perform linking between the two tables by extracting that portion. In that case, because a range search cryptogram RSK is necessary for derivation of a search key SK, linking is not performed on rows which do not need to be linked, and as a result, prevention of unnecessary leakage of information becomes possible.

Here, resulting from the dependence of the values of a range searched-for key and a range search cryptogram to be generated on the column name, it is impossible to determine whether two values included in different columns are the same or not even if the two values are actually the same, and therefore, any row to be a linking target is never identified unless the search key SK is given.

While the present invention has been described above with reference to specific exemplary embodiments thereof shown in the drawings, the present invention is not limited to the exemplary embodiments shown in the drawings, and any one of configurations which have been known in the past can be adopted as long as it exhibits the effect of the present invention.

When essential points of the novel technical contents are collected with respect to the exemplary embodiments described above, they will be as follows. Here, although part or the whole of the above-described exemplary embodiments can be described as novel technologies as follows, the present invention is not necessarily limited to the followings.

(Supplementary note 1) An encrypted database system includes:

a client terminal which encrypts, by the use of a secret key stored in advance, the whole of data in a first table having a plurality of pieces of data in a-th column and b-th column and to a second table having a plurality of pieces of data in c-th column, both of the tables being inputted from the outside respectively, outputs them, and sends a partial link command to perform linking between these tables, with respect to row whose value of the a-th column data stocked in advance is within a designated range equal to or greater than p and lower than q, so as to perform linking between rows whose values of the b-th column data stocked in advance and the c-th column data stocked in advance are equal to the outside along with a range search key generated from the secret key, the encrypted database server which receives the encrypted first and second tables, storing them, and having a partial link function for performing linking between the encrypted first and second tables, with respect to row whose value of the a-th column data stocked in advance is within a designated range equal to or greater than p and lower than q, so as to perform linking between rows whose values of the b-th column data stocked in advance and the c-th column data stocked in advance are equal, and sending back them to the client terminal according to the partial link command; wherein the client terminal and the encrypted database server are connected with each other;

the partial link function of the encrypted database server extracts, from the encrypted first table, the row whose value of a-th column data stocked in advance is within a designated range equal to or greater than p and lower than q by the use of the range search key, and, with respect to the extracted row, links rows whose value of the b-th column data stocked in advance in the encrypted first table and value of the c-th column data stocked in advance in the encrypted second table are equal.

(Supplementary note 2) The encrypted database system according to claim 1, wherein, the client terminal includes:

a search key generation unit which generates, by the use of the secret key, a search key which is a key for searching for an element in the b-th column of the first table;

a searched-for key generation unit which generates, by the use of the secret key, a searched-for key which is a key for being searched for an element having a specific value in the c-th column of second table;

a range searched-for key generation unit which generates, by the use of the secret key, a range searched-for key which is a key for being searched for an element having a specific value equal to or greater than p and lower than q in the a-th column of the first table;

an encryption unit which encrypts each element in the first and second tables by the use of the secret key; and a range search cryptogram generation unit which generates, by the use of the secret key and the search key, a range search cryptogram which is information for correlating an element in the a-th column of the first table to the search key, and wherein the client terminal encrypts the first and second tables by these units.

(Supplementary note 3) The encrypted database system according to claim 2, wherein the encryption unit of the client terminal has a function for replacing an element in the a-th column of the first table with the range searched-for key and the element in the encrypted a-th column, and an element in the b-th column of the first table with the range search cryptogram and the element in the encrypted b-th column, for replacing an element in the c-th column of the second table with the searched-for key and the element in the encrypted c-th column, and for sending them to the encrypted database server as the encrypted first and second tables; and the client terminal includes:

a range search key generation unit which generates, by the use of the secret key, a range search key which is a key for searching for an element having a specific value equal to or greater than p and lower than q in the a-th column of the first table, and sends the range it to the encrypted database server along with the partial link command.

(Supplementary note 4) The encrypted database system according to claim 3, wherein the encrypted database server includes:

a range search unit which extracts a row for which the range search key coincides with the range searched-for key in the encrypted first table;

an intra-range derivation unit which generates a subject search key, with respect to the extracted row, from the range search key and the range search cryptogram; and a search unit which finds, by the use of the subject search key and the searched-for key, a row in the encrypted second table corresponding to the extracted row in the encrypted first table, and performs linking between these rows, and wherein the encrypted database server performs the partial link function by these units.

(Supplementary note 5) A client terminal includes:

an encryption unit which encrypts the whole of data in a first table having a plurality of pieces of data in a-th column and b-th column and in a second table having a plurality of pieces of data in c-th column, both of the tables being inputted from the outside, by the use of a secret key stored in advance, and outputs them to the outside; and a range search key generation unit which generates a range search key by the use of the secret key, wherein the range search key generation unit has a function for sending, to the outside along with the range search key, a partial link command to perform linking between the first and second tables, by the use of the secret key, with respect to row in the encrypted first table whose value of a-th column data stocked in advance is within a designated range equal to or greater than p and lower than q, so as to perform linking between rows whose values of b-th column data stocked in advance and the c-th column data stocked in advance are equal.

(Supplementary note 6) The client terminal according to supplementary note 5, includes:

a search key generation unit which generates, by the use of the secret key, a search key which is a key for searching for an element in the b-th column of the first table;

a searched-for key generation unit which generates, by the use of the secret key, a searched-for key which is a key for being searched for an element having a specific value of the c-th column of the second table;

a range searched-for key generation unit which generates, by the use of the secret key, a range searched-for key which is a key for being searched for an element having a specific value equal to or greater than p and lower than q in the a-th column of the first table;

an encryption unit which encrypts each element in the first and second tables by the use of the secret key; and a range search cryptogram generation unit which generates, by the use of the secret key and the search key, a range search cryptogram which is information for correlating an element in the a-th column of the first table to the search key, (Supplementary note 7) The client terminal according to supplementary note 6, wherein:

the encryption unit has a function for replacing an element in the a-th column of the first table with the range searched-for key and the element in the a-th column having been encrypted, and an element in the b-th column of the first table with the range search cryptogram and the element in the b-th column having been encrypted, for replacing an element in the c-th column of the second table with the searched-for key and the element in the c-th column having been encrypted, and for sending them to the encrypted database server as the encrypted first and second tables; and the client terminal further comprising: a range search key generation unit which generates, by the use of the secret key, a range searched-for key which is a key for searching for an element having a specific value equal to or greater than p and lower than q in the a-th column of the first table, and sends it to the encrypted database server as the partial link command.

(Supplementary note 8) An encrypted database server receiving, from a client terminal, and storing a first table and a second table, both of the tables having been wholly encrypted, performing linking between the first and second encrypted tables, according to a partial link command including a range search key received from the client terminal, with respect to row in the encrypted first table whose value of the a-th column data is within a designated range equal to or greater than p and lower than q, by using the b-th column data and the c-th column as keys, and for sending back them to the client terminal includes:

a search unit which extracts, by the use of the search key, data in which value of the a-th column is within a designated range equal to or greater than p and lower than q from the first and second encrypted tables, and performs linking between these extracted data by using the b-th column and c-th column as keys.

(Supplementary note 9) The encrypted database server according to supplementary note 8, includes:

a range search unit which extracts a row for which the range search key coincides with the range searched-for key in the encrypted first table;

an intra-range derivation unit which generates a subject search key, with respect to the extracted row, from the range search key and the range search cryptogram; and a search unit which finds, by the use of the subject search key and the searched-for key, a row in the encrypted second table corresponding to the extracted row in the encrypted first table, and performs the linking between these rows.

(Supplementary note 10) An encrypted data linking method for an encrypted database system includes: a client terminal and an encrypted database server which are connected with each other, wherein:

the client terminal encrypts the whole of data in a first table having a plurality of pieces of data in a-th column and b-th column and in a second table having a plurality of pieces of data in c-th column, both of the tables being inputted from the outside, by the use of a secret key stored in advance, and outputs them to the encrypted database server;

the encrypted database server receives and stores the encrypted first and second tables;

the client terminal sends, to the encrypted database server along with a range search key generated from the secret key, a partial link command to perform linking between the first and second tables, with respect to row in the encrypted first table whose value of a-th column data stocked in advance is within a designated range equal to or greater than p and lower than q, so as to perform linking between rows whose values of the b-th column data stocked in advance and the c-th column data stocked in advance are equal; and the encrypted database server extracts, from the encrypted first table, row whose value of the a-th column data stocked in advance is within a designated range equal to or greater than p and lower than q by the use of the range search key, with respect to the extracted rows, links between rows whose values of the b-th column data stocked in advance and the c-th column data stocked in advance are equal, and sends back them to the client terminal.

(Supplementary note 11) The encrypted data linking method according to supplementary note 10, wherein:

a search key generation unit of the client terminal generates, by the use of the secret key, a search key which is a key for searching for an element in the b-th column of the first table;

a searched-for key generation unit of the client terminal generates, by the use of the secret key, a searched-for key which is a key for being searched for an element having a specific value in the c-th column of the second table;

a range searched-for key generation unit of the client terminal generates, by the use of the secret key, a range searched-for key which is a key for being searched for an element having a specific value equal to or greater than p and lower than q in the a-th column of the first table;

an encryption unit of the client terminal encrypts each element in the first and second tables by the use of the secret key;

a range search cryptogram generation unit of the client terminal generates, by the use of the secret key and the search key, a range search cryptogram which is information for correlating an element in the a-th column of the first table to the search key, the encryption unit of the client terminal replaces an element in the a-th column of the first table with the range searched-for key and the element in the a-th column having been encrypted, and an element in the b-th column of the first table with the range search cryptogram and the element in the b-th column having been encrypted, makes them the encrypted first table;

the encryption unit of the client terminal replaces an element in the c-th column of the second table with the searched-for key and the element in the c-th column having been encrypted, makes them the encrypted second table;

the encryption unit of the client terminal sends the encrypted first and second tables to the encrypted database server;

a range search key generation unit of the client terminal generates, by the use of the secret key, a range searched-for key which is a key for searching for an element having a specific value equal to or greater than p and lower than q in the a-th column of the first table; and the range search key generation unit of the client terminal sends the range searched-for key to the encrypted database server as the partial link command.

(Supplementary note 12) The encrypted data linking method according to supplementary note 11, wherein:

a range search unit of the encrypted database server extracts a row for which the range search key coincides with the range searched-for key in the encrypted first table;

an intra-range derivation unit of the encrypted database server generates a subject search key, with respect to the extracted row, from the range search key and the range search cryptogram; and a search unit of the encrypted database server finds, by the use of the subject search key and the searched-for key, a row in the encrypted second table corresponding to the extracted row in the encrypted first table, and performs the linking between these rows.

(Supplementary note 13) An encrypted data linking program in an encrypted database system includes: a client terminal and an encrypted database server which are connected with each other, the program causing a computer equipped with the client terminal includes:

a step of encrypting the whole of data in a first table having a plurality of pieces of data in a-th column and b-th column and in a second table having a plurality of pieces of data in c-th column, both of the tables being inputted from the outside, by the use of a secret key stored in advance, and outputting them to the encrypted database server; and a step of sending, to the encrypted database server along with a range search key generated from the secret key, a partial link command to perform linking between the first and second tables, with respect to row in the encrypted first table whose value of the a-th column data stocked in advance is within a designated range equal to or greater than p and lower than q, so as to perform linking between rows whose values of the b-th column data stocked in advance and the c-th column data stocked in advance are equal.

(Supplementary note 14) The encrypted data linking program according to supplementary note 13, includes:

a step of generating, by the use of the secret key, a search key which is a key for searching for an element in the b-th column of the first table;

a step of generating, by the use of the secret key, a searched-for key which is a key for being searched for an element having a specific value in the c-th column of the second table;

a step of generating, by the use of the secret key, a range searched-for key which is a key for being searched for an element having a specific value equal to or greater than p and lower than q in the a-th column of the first table;

a step of encrypting each element in the first and second tables by the use of the secret key;

a step of generating, by the use of the secret key and the search key, a range search cryptogram which is information for correlating an element in the a-th column of the first table to the search key;

a step of replacing an element in the a-th column of the first table with the range searched-for key and the element in the a-th column having been encrypted, and an element in the b-th column of the first table with the range search cryptogram and the element in the b-th column having been encrypted, and making them the encrypted first table;

a step of replacing an element in the c-th column of the second table with the searched-for key and the element in the c-th column having been encrypted, and making them the encrypted second table;

a step of sending the encrypted first and second tables to the encrypted database server;

a step of generating, by the use of the secret key, a range searched-for key which is a key for searching for an element having a specific value equal to or greater than p and lower than q in the a-th column of the first table; and a step of sending the range searched-for key to the encrypted database server as the partial link command.

(Supplementary note 15) An encrypted data linking program in an encrypted database system includes: a client terminal and an encrypted database server which are connected with each other, the program causing a computer equipped with the encrypted database server includes:

a step of receiving, from the client terminal, and storing a first table having a plurality of pieces of data in a-th column and b-th column and a second table having a plurality of pieces of data in c-th column, both of the tables having been wholly encrypted; and according to a partial link command including a range search key received from the client terminal, a step of extracting, from the encrypted first table, row whose value of the a-th column data stocked in advance is within a designated range equal to or greater than p and lower than q by the use of the range search key, and, with respect to the extracted rows, linking between rows whose values of the b-th column data stocked in advance and the c-th column data stocked in advance are equal, and sending back them to the client terminal.

(Supplementary note 16) The encrypted data linking program according to supplementary note 15, includes:

a step of extracting a row for which the range search key coincides with the range searched-for key in the encrypted first table;

a step of generating a subject search key, with respect to the extracted row, from the range search key and the range search cryptogram; and a step of finding, by the use of the subject search key and the searched-for key, a row in the encrypted second table corresponding to the extracted row in the encrypted first table, and performing the linking between these rows.

INDUSTRIAL APPLICABILITY

The present invention can be used in an encrypted database system. It exhibits a remarkable effect particularly in an encrypted database system to contain a great amount of security data.

REFERENCE SINGS LIST 1 encrypted database system
10 client terminal
11, 51 processor
12, 52 storage unit
13, 53 input unit
14 output unit
15 communication unit
20 initial setting unit
21 search key generation unit
22 range search key generation unit
23 searched-for key generation unit
24 range searched-for key generation unit
25 search cryptogram generation unit
26 encryption/decryption unit
31 table "X"
31a column "A"
31b column "B"
32 table "Y"
32c column "C"
33 secret key
34a range searched-for key 34b search key
34c searched-for key
34d range search cryptogram
35a range search key
41 encrypted table "X"
42 encrypted table "Y"
43a subject search key
50 encrypted database server
61 search unit
62 intra-range derivation unit
63 range search unit

The invention claimed is:

1. An encrypted database system comprising:

A processor of a client terminal which encrypts, by the use of a secret key stored in advance, the whole of data in a first table having a plurality of pieces of data in a-th column and b-th column and to a second table having a plurality of pieces of data in c-th column, both of the tables being inputted from the outside respectively, outputs them, and sends a partial link command to perform linking between these tables, with respect to row whose value of the a-th column data stocked in advance is within a designated range equal to or greater than p and lower than q, so as to perform linking between rows whose values of the b-th column data stocked in advance and the c-th column data stocked in advance are equal to the outside along with a range search key generated from the secret key, the encrypted database server which receives the encrypted first and second tables, storing them, and having a partial link function for performing linking between the encrypted first and second tables, with respect to row whose value of the a-th column data stocked in advance is within a designated range equal to or greater than p and lower than q, so as to perform linking between rows whose values of the b-th column data stocked in advance and the c-th column data stocked in advance are equal, and sending back them to said client terminal according to the partial link command; wherein the client terminal and the encrypted database server are connected with each other;

the partial link function of said encrypted database server extracts, from the encrypted first table, the row whose value of a-th column data stocked in advance is within a designated range equal to or greater than p and lower than q by the use of the range search key, and, with respect to the extracted row, links rows whose value of the b-th column data stocked in advance in the encrypted first table and value of the c-th column data stocked in advance in the encrypted second table are equal.

2. The encrypted database system according to claim 1, wherein, said client terminal comprises:

a search key generation unit which generates, by the use of said secret key, a search key which is a key for searching for an element in the b-th column of the first table;

a searched-for key generation unit which generates, by the use of the secret key, a searched-for key which is a key for being searched for an element having a specific value in the c-th column of second table;

a range searched-for key generation unit which generates, by the use of the secret key, a range searched-for key which is a key for being searched for an element having a specific value equal to or greater than p and lower than q in the a-th column of the first table;

an encryption unit which encrypts each element in the first and second tables by the use of the secret key; and a range search cryptogram generation unit which generates, by the use of the secret key and the search key, a range search cryptogram which is information for correlating an element in the a-th column of the first table to the search key, and wherein said client terminal encrypts the first and second tables by these units.

3. The encrypted database system according to claim 2, wherein said encryption unit of said client terminal has a function for replacing an element in the a-th column of the first table with the range searched-for key and the element in the encrypted a-th column, and an element in the b-th column of the first table with the range search cryptogram and the element in the encrypted b-th column, for replacing an element in the c-th column of the second table with the searched-for key and the element in the encrypted c-th column, and for sending them to said encrypted database server as the encrypted first and second tables; and said client terminal comprising:

a range search key generation unit which generates, by the use of the secret key, a range search key which is a key for searching for an element having a specific value equal to or greater than p and lower than q in the a-th column of the first table, and sends the range it to said encrypted database server along with the partial link command.

4. The encrypted database system according to claim 3, wherein said encrypted database server comprising:

a range search unit which extracts a row for which the range search key coincides with the range searched-for key in the encrypted first table;

an intra-range derivation unit which generates a subject search key, with respect to the extracted row, from the range search key and the range search cryptogram; and a search unit which finds, by the use of the subject search key and the searched-for key, a row in the encrypted second table corresponding to the extracted row in the encrypted first table, and performs linking between these rows, and wherein said encrypted database server performs the partial link function by these units.

5. An encrypted data linking method for an encrypted database system comprising: a client terminal and an encrypted database server which are connected with each other, wherein:

A processor of said client terminal encrypts the whole of data in a first table having a plurality of pieces of data in a-th column and b-th column and in a second table having a plurality of pieces of data in c-th column, both of the tables being inputted from the outside, by the use of a secret key stored in advance, and outputs them to said encrypted database server;

said encrypted database server receives and stores the encrypted first and second tables;

said client terminal sends, to said encrypted database server along with a range search key generated from the secret key, a partial link command to perform linking between the first and second tables, with respect to row in the encrypted first table whose value of a-th column data stocked in advance is within a designated range equal to or greater than p and lower than q, so as to perform linking between rows whose values of the b-th column data stocked in advance and the c-th column data stocked in advance are equal; and said encrypted database server extracts, from the encrypted first table, row whose value of the a-th column data stocked in advance is within a designated range equal to or greater than p and lower than q by the use of the range search key, with respect to the extracted rows, links between rows whose values of the b-th column data stocked in advance and the c-th column data stocked in advance are equal, and sends back them to said client terminal.

6. A computer readable non-transitory medium embodying an encrypted data linking program in an encrypted database system comprising: a client terminal and an encrypted database server which are connected with each other, said program causing a computer equipped with said client terminal to perform the method of claim 5.

* * * * *